(12) United States Patent
Xie et al.

(10) Patent No.: US 11,128,548 B2
(45) Date of Patent: Sep. 21, 2021

(54) NETWORK ELEMENT HEALTH STATUS DETECTION METHOD AND DEVICE

(71) Applicant: Huawei Technologies Co., Ltd., Shenzhen (CN)

(72) Inventors: Yuming Xie, Nanjing (CN); Qian Xiao, Shenzhen (CN); Zhiman Xiong, Shenzhen (CN); Li Xue, Nanjing (CN); Ming Chen, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 16/595,066

(22) Filed: Oct. 7, 2019

(65) Prior Publication Data

US 2020/0036605 A1    Jan. 30, 2020

Related U.S. Application Data

(63) Continuation of application No. PCT/CN2017/090290, filed on Jun. 27, 2017.

(30) Foreign Application Priority Data

Apr. 5, 2017    (CN) .......................... 201710218331.6

(51) Int. Cl.
  *H04L 12/24* (2006.01)
  *H04L 12/26* (2006.01)
(52) U.S. Cl.
  CPC ...... *H04L 41/5035* (2013.01); *H04L 41/0836* (2013.01); *H04L 41/5009* (2013.01); *H04L 43/022* (2013.01)
(58) Field of Classification Search
  CPC ............. H04L 41/5035; H04L 41/0836; H04L 41/5009; H04L 43/022

(Continued)

(56) References Cited

U.S. PATENT DOCUMENTS

2007/0283436 A1* 12/2007 Duffield .............. H04L 63/1425
                                                          726/23
2015/0138988 A1    5/2015 Shaw
(Continued)

FOREIGN PATENT DOCUMENTS

CN          101770419 A      7/2010
CN          101984702 A      3/2011
(Continued)

OTHER PUBLICATIONS

Huawei Tech Co Ltd., "Y. INADF: Framework for Intelligent Network Analytics and Diagnostics," SG12-C.53 R1, Study Group 12, Geneva, Jan. 10-19, 2017, 20 pages.

(Continued)

*Primary Examiner* — Kevin T Bates
*Assistant Examiner* — Chen-Liang Huang
(74) *Attorney, Agent, or Firm* — Conley Rose, P.C.

(57) ABSTRACT

A network element health status detection method and device, where the method includes: determining sampled data of at least one key performance indicator (KPI) of a target network element in a first time window; obtaining a fluctuation score of any KPI in the at least one KPI according to sampled data of the any KPI in the first time window and a steady state value of the any KPI; and determining a health status of the target network element based on a fluctuation score of each KPI. Therefore, a network element health status is determined using single-point performance data of a network element and performance data in a network element time window.

23 Claims, 4 Drawing Sheets

(58) Field of Classification Search
USPC .......................................................... 709/223
See application file for complete search history.

(56) References Cited

U.S. PATENT DOCUMENTS

| | | | |
|---|---|---|---|
| 2016/0104090 A1* | 4/2016 | Alekseyev | G06Q 10/06393 |
| | | | 705/7.39 |
| 2016/0248624 A1 | 8/2016 | Tapia et al. | |
| 2016/0274990 A1 | 9/2016 | Addleman et al. | |
| 2019/0132781 A1* | 5/2019 | Arnold | H04W 36/22 |

FOREIGN PATENT DOCUMENTS

| | | |
|---|---|---|
| CN | 102571406 A | 7/2012 |
| CN | 103368776 A | 10/2013 |
| CN | 103780415 A | 5/2014 |
| CN | 105554793 A | 5/2016 |
| WO | 2015122818 A1 | 8/2015 |

OTHER PUBLICATIONS

3GPP TS 32.410 V13.0.0, "3rd Generation Partnership Project; Technical Specification Group Services and System Aspects; Telecommunication management; Key Performance Indicators (KPI) for UMTS and GSM (Release 13)," XP051047912, Jan. 2016, 27 pages.

\* cited by examiner

NETWORK ELEMENT HEALTH STATUS DETECTION METHOD AND DEVICE

CROSS-REFERENCE TO RELATED APPLICATIONS

This application is a continuation of International Patent Application No. PCT/CN2017/090290, filed on Jun. 27, 2017, which claims priority to Chinese Patent Application No. 201710218331.6, filed on Apr. 5, 2017. The disclosures of the aforementioned applications are hereby incorporated by reference in their entireties.

TECHNICAL FIELD

The present disclosure relates to communications technologies, and in particular, to a network element health status detection method and device.

BACKGROUND

Network operation and maintenance management refers to a production organization management activity for ensuring a normal, safe, and effective operation of a network and a service. The network operation and maintenance management is mainly used to maintain stability of the network and the service and to rectify a fault and optimize the network in a timely manner. As a network system becomes more complex, the network system is challenged by various problems such as system breakdown, overloading, and a hardware fault. In addition, high costs, long time consumed, and poor service quality are major challenges in current network operation and maintenance management. How to identify a health status of a network element and prevent a fault becomes a key to the network operation and maintenance management.

Currently, a network status of a network element in the network operation and maintenance management is identified using an active operation and maintenance service. In this solution, a threshold detection system needs to be established for a network element. When an indicator value of the network element at a time point is lower than or exceeds a reference threshold, it indicates that the network element has a relatively low working efficiency and even cannot meet a minimum working requirement, and the network element is alerted.

A current threshold alarm system considers only single-time-point performance data of a network device, and does not accurately identify the network element health status.

SUMMARY

Embodiments of the present disclosure provide a network element health status detection method and device, in order to resolve a problem that it is inaccurate to determine a network element health status by considering only single-point moment performance data of a network element and a baseline threshold.

According to a first aspect, an embodiment of this application provides a network element health status detection method. The method includes: determining, by a detection device, sampled data of at least one key performance indicator (KPI) of a target network element in a first time window; obtaining, by the detection device, a fluctuation score of any KPI in the at least one KPI according to sampled data of the any KPI in the first time window and a steady state value of the any KPI; and determining, by the detection device, a health status of the target network element based on a fluctuation score of each of the at least one KPI.

In this solution, fluctuation is determined using performance data in a network element time window, and the network element health status is determined based on the fluctuation. A problem of inaccurate judgment by considering only single-point moment performance data of the network element is resolved. Therefore, this solution can be used to identify the network element health status more accurately.

In one optional implementation, the fluctuation is used to represent a degree of deviation of the any KPI from a steady state represented by the steady state value.

In another optional implementation, the "obtaining, by the detection device, a fluctuation score of any KPI in the at least one KPI according to sampled data of the any KPI in the first time window and a steady state value of the any KPI" may include: calculating a distance between the sampled data of the any KPI in the first time window and the steady state value of the any KPI; and obtaining the fluctuation score according to the distance between the sampled data of the any KPI in the first time window and the steady state value of the any KPI. The steady state value is used to represent a KPI steady state.

In still another optional implementation, the "calculating a distance between the sampled data of the any KPI in the first time window and the steady state value of the any KPI" may include calculating the distance between the sampled data of the any KPI in the first time window and the steady state value of the any KPI using one of a standard deviation method, an average deviation method, or a variation coefficient method.

The fluctuation score is obtained according to the distance between the sampled data of the any KPI in the first time window and the steady state value of the any KPI, and the health status of the target network element is determined by the fluctuation score. Therefore, the distance between the sampled data of the any KPI in the first time window and the steady state value is calculated using one of the standard deviation method, the average deviation method, or the variation coefficient method, and then the fluctuation score is determined based on the distance between the sampled data and the steady state value. In this way, it can be ensured that a more accurate fluctuation score of the any KPI is obtained, such that the health status of the target network element is determined more accurately.

In yet another optional implementation, the method further includes: determining, by the detection device, sampled data of the any KPI in a second time window, where an end time of the second time window is less than or equal to an end time of the first time window; and calculating, by the detection device, the steady state value of the any KPI based on the sampled data of the any KPI in the second time window. Usually, the second time window is greater than the first time window. Because the second time window is greater than the first time window, a large amount of data is collected in the second time window, and a state of the any KPI is better represented. Therefore, a fluctuation score that is obtained based on the sampled data in the first time window and by considering the steady state value calculated from the sampled data in the second time window is more accurate.

In yet another optional implementation, the "calculating the steady state value of the any KPI based on the sampled data of the any KPI in the second time window" may include calculating the steady state value of the any KPI based on the sampled data of the any KPI in the second time window after an abnormal point and/or a noise point are/is removed. The sampled data in the second time window is not fully applied to calculate the steady state value of the any KPI. Therefore, in this method, the abnormal point and/or the noise point in the sampled data in the second time window need/needs to be removed, and the steady state value of the any KPI is calculated more accurately based on the sampled data of the any KPI after the abnormal point and/or the noise point are/is removed.

In yet another optional implementation, the "determining a health status of the target network element based on a fluctuation score of each of the at least one KPI" may include: obtaining a reliability score of the any KPI through weighted calculation according to the fluctuation score and at least one of a trend score of the any KPI or a score of a distance between the any KPI and a network element hardware property threshold; and determining the health status of the target network element based on a reliability score of each of the at least one KPI. If the health status of the target network element is determined based only on a fluctuation score of each of the at least one KPI, the fluctuation score in the process is equivalent to the reliability score. In another method, a reliability score of the target network element is obtained through weighted calculation according to the fluctuation score and the score of the distance between the any KPI and the network element hardware property threshold, and the health status of the target network element may be determined based on the reliability score of the target network element. In this method, not only the fluctuation score is considered, but also the score of the distance between the any KPI and the network element hardware property threshold is considered. Therefore, in this method, the health status of the target network element is determined accurately. In still another method, a reliability score of the target network element is obtained through weighted calculation according to the fluctuation score of the any KPI and the trend score of the any KPI, and the health status of the target network element may be determined based on the reliability score of the target network element. In this method, not only the fluctuation score is considered, but also the trend score is considered. Therefore, in this method, the health status of the target network element is determined accurately.

In yet another optional implementation, the method further includes: determining, by the detection device, sampled data of the any KPI of the target network element in a detection moment, where the detection moment is the end time of the first time window; and determining, by the detection device, a score of a distance between the any KPI and the network element hardware property threshold based on the sampled data of the any KPI in the detection moment and a preset network element hardware property threshold of the any KPI.

In yet another optional implementation, the "obtaining a reliability score of the any KPI through weighted calculation according to the fluctuation score and at least one of a trend score of the any KPI or a score of a distance between the any KPI and a network element hardware property threshold" may include obtaining a reliability score of the any KPI through weighted calculation according to the fluctuation score of the any KPI, the trend score of the any KPI, and a score of a distance between the any KPI and the network element hardware property threshold. Because the fluctuation score of the any KPI, the trend score of the any KPI, and the score of the distance between the any KPI and the network element hardware property threshold are all considered, network element performance is determined using both the single-point performance data of the network element and the performance data in the network element time window, a reliability score is obtained according to the network element performance, and the network element health status is determined based on the reliability score. In the process, health of the network element is identified more accurately.

In yet another optional implementation, the method further includes: determining, by the detection device, sampled data of the any KPI in a third time window, where the third time window is greater than the first time window, and an end time of the third time window is less than or equal to the end time of the first time window; sequentially sorting, by the detection device, the sampled data of the any KPI in the third time window based on a collection time of the sampled data to obtain sorted data, decomposing the sorted data, and determining a trend component of the any KPI; and obtaining the trend score of the any KPI according to the trend component of the any KPI. The collection time of the sampled data of the any KPI in the third time window is fully used to sequentially sort the sampled data to obtain the sorted data, decompose the sorted data to obtain the trend component of the any KPI, and determine the trend score of the any KPI based on the trend component of the any KPI. Therefore, in the process, a more accurate trend score can be obtained.

In yet another optional implementation, the "at least one KPI includes a plurality of KPIs, and the determining the health status of the target network element based on a reliability score of each of the at least one KPI" may include: performing weighted calculation on a reliability score of each of the plurality of KPIs to determine a reliability score of the target network element; and determining the health status of the target network element based on the reliability score of the target network element. The reliability score of the target network element is determined through the weighted calculation. Therefore, accuracy of detecting the health status of the target network element is improved.

In yet another optional implementation, the "health status of the target network element" may include: a fault state, a sub-healthy state, or a normal state. Based on the obtained reliability score, the health status of the target network element is determined, and the health status of the target network element is specifically divided into three states, such that the health status of the target network element can be obtained more visually. For example, if the target network element is in the sub-healthy state, an active warning may be prompted; or if the target network element is in the fault state, a fault may be prompted and a fault alarm is given.

In yet another optional implementation, the "at least one KPI" may include a pre-correction bit error rate and/or a post-correction bit error rate.

According to a second aspect, an embodiment of this application provides a network element health status detection apparatus. The apparatus includes: an obtaining module configured to obtain sampled data of at least one key performance indicator KPI of a target network element; and a health status determining module configured to: obtain a fluctuation score of any KPI in the at least one KPI according to sampled data of the any KPI in the first time window and a steady state value of the any KPI; and determine a health status of the target network element based on a fluctuation score of each of the at least one KPI.

In this solution, fluctuation is determined using performance data in a network element time window, and the network element health status is determined based on the fluctuation. A problem of inaccurate judgment by considering only single-point moment performance data of the network element is resolved. Therefore, this solution can be used to identify the network element health status more accurately.

In an optional implementation, the detection apparatus further includes an application module, configured to present health status of the target network element.

In another optional implementation, the fluctuation is used to represent a degree of deviation of the any KPI from a steady state represented by the steady state value.

In another optional implementation, the health status determining module is configured to: calculate a distance between the sampled data of the any KPI in the first time window and the steady state value of the any KPI; and obtain the fluctuation score according to the distance between the sampled data of the any KPI in the first time window and the steady state value of the any KPI.

In still another optional implementation, the health status determining module is configured to calculate the distance between the sampled data of the any KPI in the first time window and the steady state value of the any KPI using one of a standard deviation method, an average deviation method, or a variation coefficient method.

In yet another optional implementation, the health status determining module is further configured to calculate the steady state value of the any KPI based on sampled data of the any KPI in a second time window, where an end time of the second time window is less than or equal to an end time of the first time window. Usually, the second time window is greater than the first time window. Because the second time window is greater than the first time window, a large amount of data is collected in the second time window, and a steady state of the any KPI is better represented. Therefore, a fluctuation score that is obtained based on the sampled data in the first time window and by considering the steady state value calculated from the sampled data in the second time window is more accurate.

In yet another optional implementation, the health status determining module is configured to calculate the steady state value of the any KPI based on the sampled data of the any KPI in the second time window after an abnormal point and/or a noise point are/is removed.

In yet another optional implementation, the health status determining module is configured to: obtain a reliability score of the any KPI through weighted calculation according to the fluctuation score and at least one of a trend score of the any KPI or a score of a distance between the any KPI and a network element hardware property threshold; and determine the health status of the target network element based on a reliability score of each of the at least one KPI.

In yet another optional implementation, the health status determining module is configured to determine a score of a distance between the any KPI and the network element hardware property threshold based on the sampled data of the any KPI in the detection moment and a preset network element hardware property threshold corresponding to the any KPI, where the detection moment is the end time of the first time window.

In yet another optional implementation, the health status determining module is further configured to: sequentially sort the sampled data of the any KPI in the third time window based on a collection time of the sampled data to obtain sorted data, decompose the sorted data, and determine a trend component of the any KPI; and obtain the trend score of the any KPI according to the trend component of the any KPI, where the third time window is greater than the first time window, and an end time of the third time window is less than or equal to the end time of the first time window.

In yet another optional implementation, the at least one KPI includes a plurality of KPIs, and the health status determining module is configured to: perform weighted calculation on a reliability score of each of the plurality of KPIs to determine a reliability score of the target network element; and determine the health status of the target network element based on the reliability score of the target network element.

In yet another optional implementation, the at least one KPI includes a plurality of KPIs, and the health status determining module is configured to: perform weighted calculation on a fluctuation score of each of the plurality of KPIs to determine a reliability score of the target network element; and determine the health status of the target network element based on the reliability score of the target network element.

In yet another optional implementation, the health status of the target network element includes a fault state, a sub-healthy state, or a normal state.

In yet another optional implementation, the at least one KPI may include a pre-correction bit error rate and/or a post-correction bit error rate.

According to a third aspect, an embodiment of this application provides a network element health status detection device. The device includes a transceiver and a processor. The transceiver is configured to receive sampled data of at least one key performance indicator KPI of a target network element. The processor is configured to obtain a fluctuation score of any KPI in at least one KPI according to sampled data of the any KPI in a first time window and a steady state value of the any KPI. The processor is further configured to determine a health status of the target network element based on a fluctuation score of each of the at least one KPI.

In this solution, fluctuation is determined using performance data in a network element time window, and the network element health status is determined based on the fluctuation. A problem of inaccurate judgment by considering only single-point moment performance data of the network element is resolved. Therefore, this solution can be used to identify the network element health status more accurately.

In one optional implementation, the fluctuation is used to represent a degree of deviation of the any KPI from a steady state represented by the steady state value.

In another optional implementation, the processor is further configured to: calculate a distance between the sampled data of the any KPI in the first time window and the steady state value of the any KPI; and obtain the fluctuation score according to the distance between the sampled data of the any KPI in the first time window and the steady state value of the any KPI.

In still another optional implementation, the processor is further configured to calculate the distance between the sampled data of the any KPI in the first time window and the steady state value of the any KPI using one of a standard deviation method, an average deviation method, or a variation coefficient method.

The fluctuation score is obtained according to the distance between the sampled data of the any KPI in the first time window and the steady state value of the any KPI, and the health status of the target network element is determined by the fluctuation score. Therefore, the distance between the sampled data of the any KPI in the first time window and the steady state value is calculated using one of the standard deviation method, the average deviation method, or the variation coefficient method, and then the fluctuation score is determined based on the distance between the sampled data and the steady state value. In this way, it can be ensured that a more accurate fluctuation score of the any KPI is obtained, such that the health status of the target network element is determined more accurately.

In yet another optional implementation, the processor is further configured to determine sampled data of the any KPI of the target network element in a second time window, where the second time window is greater than the first time window, and an end time of the second time window is less than or equal to an end time of the first time window.

The processor is further configured to calculate a steady state value of the any KPI based on the sampled data of the any KPI in the second time window. Usually, the second time window is greater than the first time window. The end time of the second time window is less than or equal to the end time of the first time window. Because the second time window is greater than the first time window, a large amount of data is collected in the second time window, and a state of the any KPI is better represented. Therefore, a fluctuation score that is obtained based on the sampled data in the first time window and by considering the steady state value calculated from the sampled data in the second time window is more accurate.

In yet another optional implementation, the processor is further configured to calculate the steady state value of the any KPI based on the sampled data of the any KPI in the second time window after an abnormal point and/or a noise point are/is removed. In this method, the abnormal point and/or the noise point need/needs in the sampled data in the second time window to be removed, and the steady state value of the any KPI is calculated more accurately based on the sampled data of the any KPI after the abnormal point and/or the noise point are/is removed.

In yet another optional implementation, the processor is further configured to: obtain a reliability score of the any KPI through weighted calculation according to the fluctuation score and at least one of a trend score of the any KPI or a score of a distance between the any KPI and a network element hardware property threshold; and determine the health status of the target network element based on a reliability score of each of the at least one KPI. If the health status of the target network element is determined based on a fluctuation score of each of the at least one KPI, the fluctuation score in the process is equivalent to the reliability score. In another method, a reliability score of the target network element is obtained through weighted calculation according to the fluctuation score and the score of the distance between the any KPI and the network element hardware property threshold, and the health status of the target network element may be determined based on the reliability score of the target network element. In this method, not only the fluctuation score is considered, but also the score of the distance between the any KPI and the network element hardware property threshold is considered. Therefore, in this method, the health status of the target network element is determined accurately. In still another method, a reliability score of the target network element is obtained through weighted calculation according to the fluctuation score of the any KPI and the trend score of the any KPI, and the health status of the target network element may be determined based on the reliability score of the target network element. In this method, not only the fluctuation score is considered, but also the trend score is considered. Therefore, in this method, the health status of the target network element is determined accurately.

In yet another optional implementation, the processor is further configured to: determine sampled data of the any KPI of the target network element in a detection moment, where the detection moment is the end time of the first time window; and determine a score of a distance between the any KPI and the network element hardware property threshold based on the sampled data of the any KPI in the detection moment and a preset network element hardware property threshold of the any KPI.

In yet another optional implementation, the processor is further configured to determine sampled data of the any KPI of the target network element in a third time window, where the third time window is greater than the first time window, and an end time of the third time window is less than or equal to the end time of the first time window.

The processor is further configured to: sequentially sort the sampled data based on a collection time of the sampled data of the any KPI in the third time window to obtain sorted data, decompose the sorted data, and determine a trend component of the any KPI; and determine the trend score of the any KPI based on the trend component of the any KPI. The collection time of the sampled data of the any KPI in the third time window is fully used to sequentially sort the sampled data to obtain the sorted data, decompose the sorted data to obtain the trend component of the any KPI, and determine the trend score of the any KPI based on the trend component of the any KPI. Therefore, in the process, a more accurate trend score can be obtained.

In yet another optional implementation, the processor is further configured to: perform weighted calculation on a reliability score of each of a plurality of KPIs to determine the reliability score of the target network element; and determine the health status of the target network element based on the reliability score of the target network element. The reliability score of the target network element is determined through the weighted calculation. Therefore, accuracy of detecting the health status of the target network element is improved.

In yet another optional implementation, the processor is further configured to: perform weighted calculation on a fluctuation score of each of a plurality of KPIs to determine the reliability score of the target network element; and determine the health status of the target network element based on the reliability score of the target network element. In yet another optional implementation, the "health status of the target network element" may include: a fault state, a sub-healthy state, or a normal state. Based on the obtained reliability score, the health status of the target network element is determined, and the health status of the target network element is specifically divided into three states, such that the health status of the target network element can be obtained more visually. For example, if the target network element is in the sub-healthy state, an active warning may be prompted. Alternatively, if the target network element is in the fault state, a fault may be prompted and a fault alarm is given.

In yet another optional implementation, the "at least one KPI" may include a pre-correction bit error rate and/or a post-correction bit error rate.

According to a fourth aspect, an embodiment of this application provides a troubleshooting device. The troubleshooting device includes a transceiver and a processor, where the transceiver is configured to receive sampled data of any KPI of a target network element in a first time window. The processor is configured to: obtain a fluctuation score of the any KPI according to the sampled data of the any KPI in the first time window and a steady state value of the any KPI; and determine a health status of the target network element based on the fluctuation score of the any KPI. When the troubleshooting device runs, the processor executes a computer execution instruction stored in a memory, such that the troubleshooting device performs the troubleshooting method in the first aspect and the various optional manners of the first aspect.

According to a fifth aspect, an embodiment of this application provides a computer storage medium, configured to store a computer software instruction used by the troubleshooting device, where the computer software instruction includes a program designed for performing the first aspect and the optional implementations.

According to a sixth aspect, an embodiment of this application provides a computer program product, configured to store a computer software instruction used by the troubleshooting device, where the computer software instruction includes a program designed for performing the first aspect and the optional implementations.

DESCRIPTION OF EMBODIMENTS

To facilitate understanding of embodiments of the present disclosure, the following further describes the embodiments of the present disclosure in detail using embodiments with reference to the accompanying drawings. The embodiments do not limit the embodiments of the present disclosure.

The embodiments of the present disclosure provide a network element health status detection method and device, and a network element health status is determined using performance data in a time window. A problem of inaccurate judgment by considering only single-point moment performance data of the network element is resolved. Therefore, this solution can be used to identify the network element health status more accurately.

Figure 1:
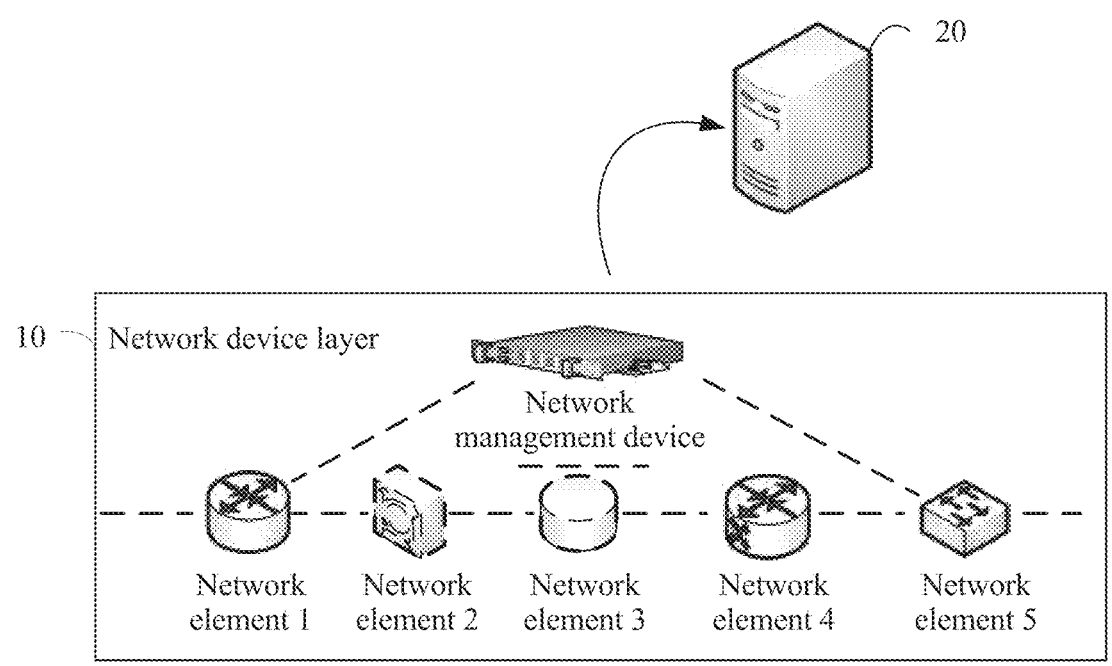
FIG. 1 is an application scenario diagram of a network element health status detection method according to an embodiment of the present disclosure.

FIG. 1 is an application scenario diagram of a network element health status detection method according to an embodiment of the present disclosure. As shown in FIG. 1, the application scenario includes a network device layer 10 and a detection device 20. The network device layer 10 includes a network management device and at least one network element. Each of the at least one network element may periodically send sampled data to the detection device 20. Alternatively, each of the at least one network element may periodically send sampled data to the network management device, and the network management device sends the sampled data of each of the at least one network element to the detection device 20. For example, the sampled data of each of the at least one network element includes sampled data of at least one KPI of each of the at least one network element.

The detection device 20 includes a transceiver and a processor. The transceiver is configured to receive the sampled data of the at least one KPI of each of the at least one network element. The processor is configured to: obtain a fluctuation score of any KPI in the at least one KPI according to sampled data of the any KPI and a steady state value of the any KPI; and determine a network element health status based on a fluctuation score of each of the at least one KPI.

Figure 2:
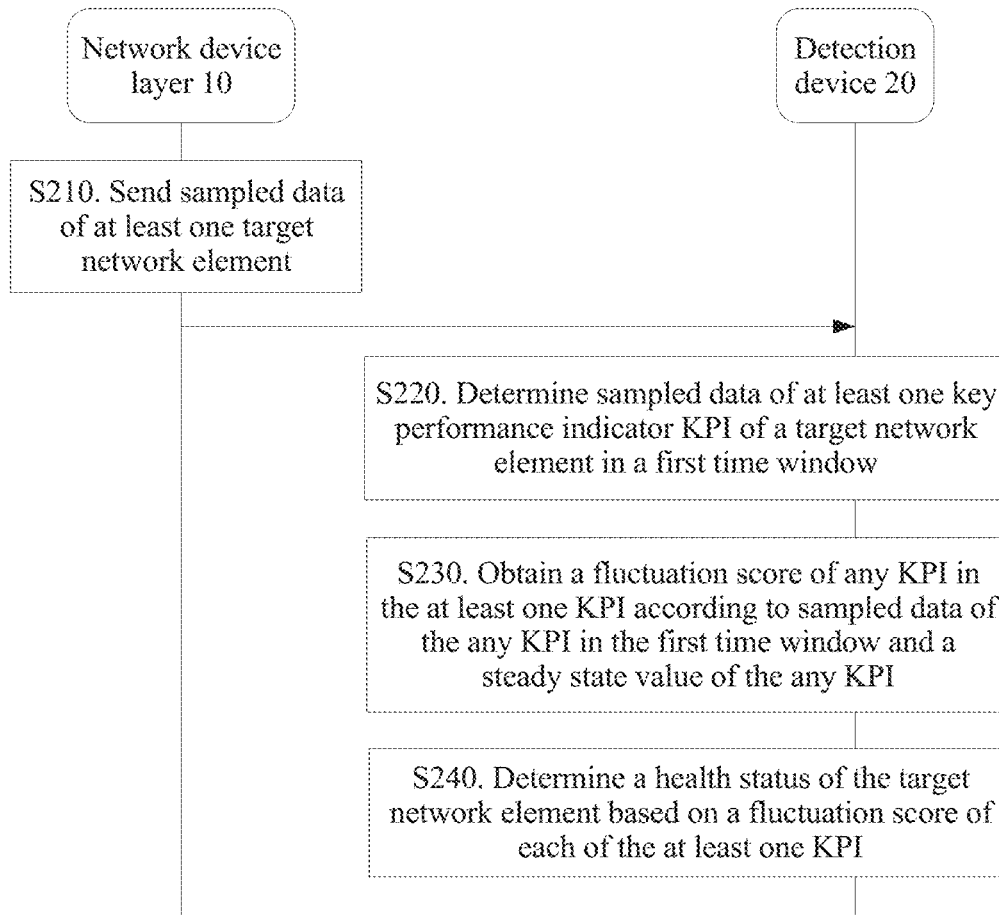
FIG. 2 is a schematic interaction diagram of a network element health status detection method according to an embodiment of the present disclosure.

FIG. 2 is a schematic interaction diagram of a network element health status detection method according to an embodiment of the present disclosure. As shown in FIG. 2, the method includes the following steps.

S210. A network device layer 10 sends sampled data of at least one network element to a detection device 20.

For example, each of the at least one network element may periodically send sampled data to the detection device 20. Alternatively each of the at least one network element may periodically send sampled data to a network management device, and the network management device sends the sampled data of each of the at least one network element to the detection device 20. The sampled data of each of the at least one network element includes sampled data of at least one KPI of each of the at least one network element. For example, the at least one KPI includes a pre-correction bit error rate and/or a post-correction bit error rate.

The network device layer periodically sends sampled data of a target network element to an interface of the detection device. For example, the network device layer periodically sends the sampled data of the target network element to the interface of the detection device using the Common Object Request Broker Architecture (CORBA) protocol.

The detection device may configure a parameter in advance according to a service type provided by a to-be-detected network element. A configured parameter usually includes a KPI required for detection, and may further include a threshold (for example, a network element hardware property threshold) required for detection. In an implementable example, if the network element health status is evaluated based on a wavelength division service provided by a network element, system configuration 1 and system configuration 2 may be configured through a configuration interface of the detection device. Fields corresponding to the system configuration 1 are respectively a Key1, a KPI1, and a KPI2. . . . The Key1, the KPI1, and the KPI2 respectively correspond to a wavelength division service quality warning, a pre-correction bit error rate, and a post-correction bit error rate, and are used to indicate a quality warning of the wavelength division service. The network element health status is evaluated mainly using two KPIs: the pre-correction bit error rate and the post-correction bit error rate. Fields corresponding to the system configuration 2 are respectively KPI, Board_type, and FEC_THD. The KPI, the Board_type, and FEC_THD respectively correspond to a pre-correction bit error rate, a wavelength division line board NS2, and a threshold $10^{-6}$, and are used to indicate that a network element hardware property threshold of KPI is $10^{-6}$ for the pre-correction bit error rate of the wavelength division line board NS2. The system configuration 1 and the system configuration 2 may be preset.

Optionally, the detection device sends, to the network device layer, feedback information that includes the KPI required for detection. Correspondingly, the network device layer periodically sends sampled data of the KPI required for detection to the detection device according to the feedback information. For example, the feedback information may be directly sent by the detection device 20 to the at least one network element. Alternatively, the feedback information may be first sent to the network management device, and then the network management device sends the feedback information to at least one target network element.

S220. The detection device determines sampled data of at least one KPI (for example, a pre-correction bit error rate and/or a post-correction bit error rate) of a to-be-detected network element (referred to as a target network element below) in a first time window.

Figure 3:
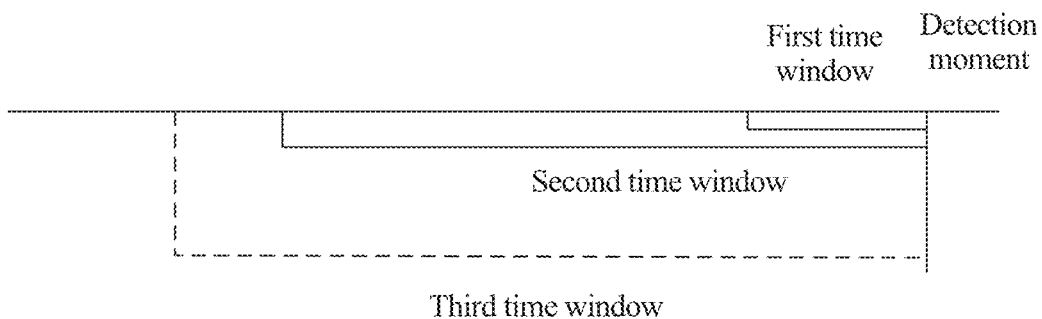
FIG. 3 is a schematic diagram of a time window status according to an embodiment of the present disclosure.

As shown in FIG. 3, an end time of the first time window is a detection moment, and the detection moment is usually a moment corresponding to latest collection data collected before step S220 is performed. The first time window is a time range, for example, eight hours before the detection moment.

S230. The detection device obtains a fluctuation score of any KPI in the at least one KPI according to sampled data of the any KPI in the first time window and a steady state value of the any KPI.

It should be noted that, in step S230, the fluctuation score of the any KPI in the at least one KPI is calculated. If the at least one KPI includes only one KPI (for example, a pre-correction bit error rate), a fluctuation score of the KPI (for example, a pre-correction bit error rate) is calculated in step S230. If the at least one KPI includes a plurality of KPIs (for example, a pre-correction bit error rate and a post-correction bit error rate), a fluctuation score of each of the plurality of KPIs is calculated in step S230 (for example, a fluctuation score of the pre-correction bit error rate and a fluctuation score of the post-correction bit error rate).

For ease of description, the any KPI is referred to as a target KPI below. For example, when the fluctuation score of the pre-correction bit error rate is calculated, the target KPI refers to the pre-correction bit error rate; and when the fluctuation score of the post-correction bit error rate is calculated, the target KPI refers to the post-correction bit error rate.

Fluctuation is one of important indicators for measuring the network element health status. Fluctuation of the target KPI is used to represent a degree of deviation of the target KPI from a steady state. For example, a fluctuation calculation method is to obtain the fluctuation score according to a distance (referred to as a fluctuation distance below) between the sampled data of the target KPI in the first time window and the steady state value of the target KPI. The fluctuation distance may be calculated using one of a standard deviation method, an average deviation method, or a variation coefficient method.

For example, the fluctuation distance is calculated using the following formula:

$$sDeviationDist = \begin{cases} 100 - 50*\sigma & 0 \leq \sigma \leq 2 \\ 0 & \sigma > 2 \end{cases},$$

where sDeviationDist is the fluctuation score of the target KPI, and $\sigma$ is the fluctuation distance.

In an example, the fluctuation distance may be calculated using the standard deviation method:

$$\sigma = \sqrt{\frac{1}{N}\sum_{i=1}^{N}(X_i - \mu)^2},$$

where $\sigma$ is the fluctuation distance, $X_i$ is sampled data at a single sampling point in the first time window (that is, a KPI value), $\mu$ is the steady state value of the target KPI, and N is a quantity of pieces of the sampled data in the first time window (for example, if the first time window is eight hours before the detection moment and data is collected every 15 minutes, N is 32).

In another example, the fluctuation distance is calculated using the average deviation method. The average deviation method eliminates a positive or negative property of a deviation using an absolute value. The average deviation method can use an average value or a median as a reference value.

In still another example, the fluctuation distance is calculated using the variation coefficient method. A ratio of a standard deviation to a mean value is referred to as a variation coefficient. The variation coefficient method may be applied to compare discrete degrees of two groups of data. If measurement scales of the two groups of data have a large difference, or data dimensions of the two groups of data are different, the standard deviation is usually not used directly to compare the discrete degrees of the two groups of data. In this case, the variation coefficient method is used to eliminate impacts of the measurement scales and the measurement dimensions.

Generally, a greater fluctuation distance indicates larger fluctuation. Usually, the larger fluctuation indicates a greater fluctuation score, and less fluctuation indicates a smaller fluctuation score.

The steady state value of the target KPI is used to represent a steady state of the target KPI. The steady state value of the target KPI theoretically refers to an average value of the target KPI within a relatively long period of time.

Figure 4:
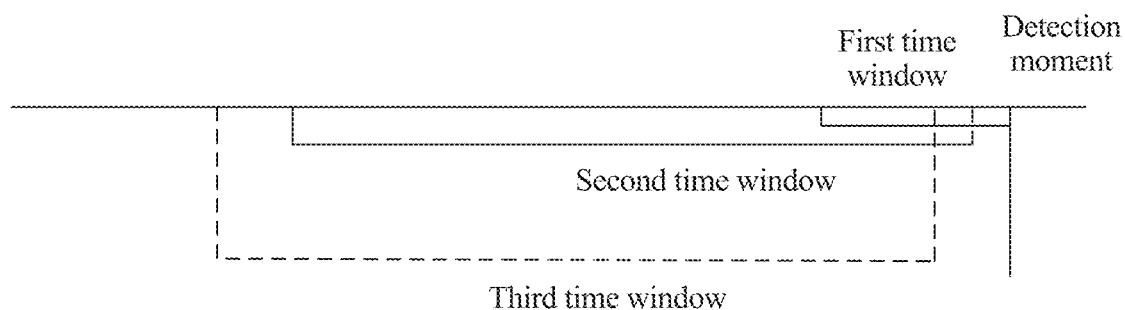
FIG. 4 is a schematic diagram of another time window status according to an embodiment of the present disclosure.

The detection device may calculate the steady state value of the target KPI based on sampled data of the target KPI in a second time window. The second time window is usually greater than or equal to the first time window, for example, a length of the second time window is 24 hours. An end time of the second time window may be less than or equal to the end time of the first time window. As shown in FIG. 3, the end time of the second time window is equal to the end time of the first time window. As shown in FIG. 4, the end time of the second time window is less than the end time of the first time window.

Figure 7:
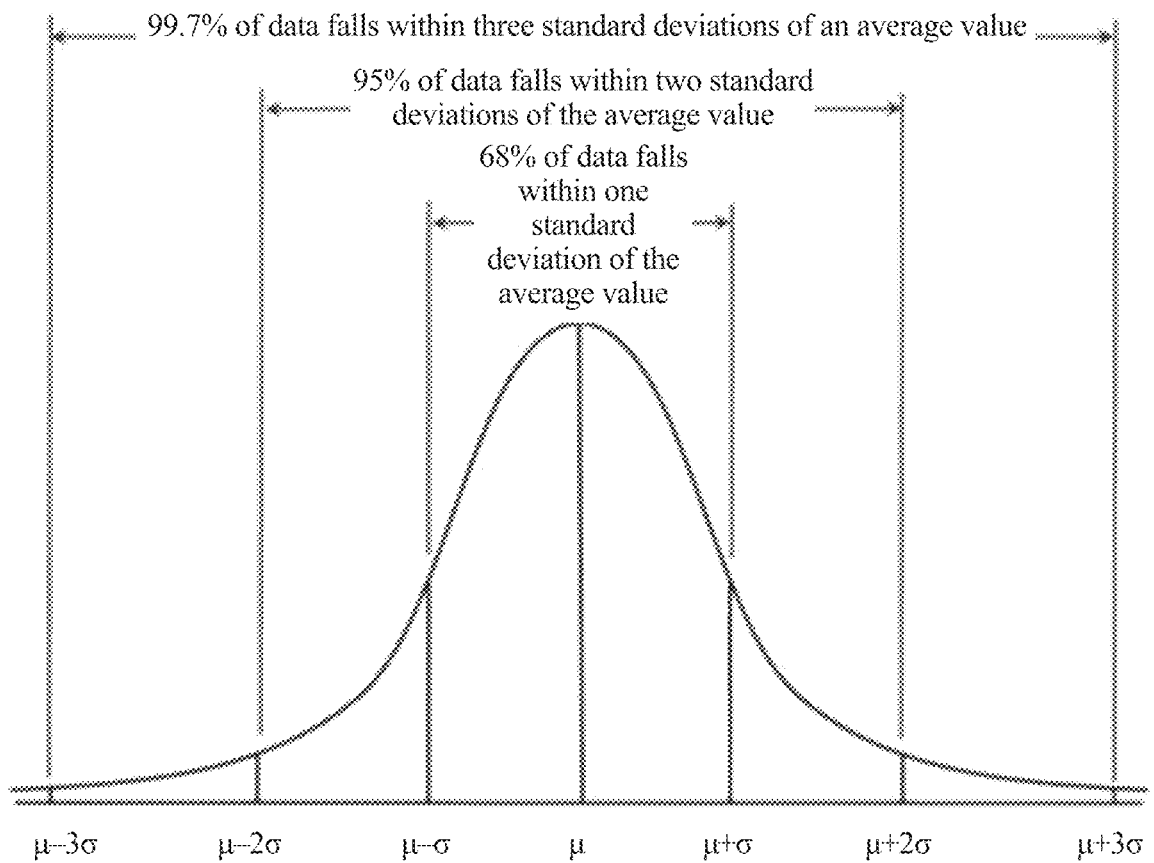
FIG. 7 is a schematic diagram of an abnormal point removal method according to an embodiment of the present disclosure.

In some implementations, the detection device calculates the steady state value of the target KPI based on the sampled data of the target KPI in the second time window after an abnormal point and/or a noise point are/is removed. For example, an average value of the sampled data of the target KPI after the abnormal point and/or the noise point are/is removed may be used as the steady state value of the target KPI. Further, normal distribution may be used to remove the abnormal point from the sampled data of the target KPI in the second time window. For example, a 3 sigma principle may be used to remove the abnormal point from the sampled data of the target KPI in the second time window. As shown in FIG. 7, a KPI data point outside $[u-3\sigma, u+3\sigma]$ is the abnormal point. A principal component analysis method may be used to reduce a dimension of the sampled data of the target KPI in the second time window and to remove the noise point.

S240. The detection device determines a health status of the target network element based on a fluctuation score of each of the target KPI.

The health status of the target network element may be a fault state, a sub-healthy state, or a normal state. Further, if the target network element is in the sub-healthy state, an active warning may be prompted. Alternatively, if the target network element is in the fault state, a fault may be prompted and a fault alarm is given.

For example, the detection device may determine a reliability score of the target KPI based on the fluctuation score of the target KPI, and determine the health status of the target network element based on a reliability score of each KPI.

Generally, a higher reliability score indicates a better network element health status.

When a reliability score of the target KPI is determined based only on the fluctuation score of the target KPI, the fluctuation score of the target KPI may be directly used as the reliability score of the target KPI.

When the reliability score of the target KPI is determined based on at least two scores in the fluctuation score of the target KPI, a trend score of the target KPI, and a score of a distance (referred to as a threshold distance below) between the target KPI and the network element hardware property threshold, where the at least two scores are the fluctuation score of the target KPI and at least one of the trend score of the target KPI or the score of the distance between the target KPI and the network element hardware property threshold, weighted calculation may be performed on the at least two scores to obtain the reliability score of the target KPI. For example, the reliability score of the target KPI may be calculated using the following formula:

$$sReliability = \alpha * sDeviationDist + (\beta * sThresDist + \lambda * sTrend)$$

where sReliability is the reliability score of the target KPI, sDeviationDist is the fluctuation score of the target KPI, sTrend is the trend score of the target KPI, and sThresDist is a threshold distance score corresponding to the target KPI. $\alpha$, $\beta$, and $\lambda$ are weighting coefficients of sDeviationDist, sThresDist, and sTrend, and $\alpha + \beta + \lambda = 1$.

The weighting coefficients may be preset, or may be determined through training. Generally, sDeviationDist is mandatory, and sTrend and sThresDist are optional.

The threshold distance refers to a distance between the sampled data of the target KPI (for example, the pre-correction bit error rate) and the network element hardware property threshold (for example, $10^{-6}$) corresponding to the target KPI. Correspondingly, the threshold distance score is used to represent reliability that is of the target KPI and that can be reflected by the threshold distance. Usually, when the sampled data of the target KPI is greater than the network element hardware property threshold, a distance between the sampled data of the target KPI and the network element hardware property threshold is smaller. That is, a threshold distance is smaller, and a threshold distance score of the target KPI is lower. This indicates lower reliability of the target network element reflected by the target KPI.

It should be noted that the network element hardware property threshold generally depends on a hardware property of the network element. For example, a network element hardware property threshold corresponding to the pre-correction bit error rate indicates that a post-correction bit error occurs after the pre-correction bit error rate reaches the network element hardware property threshold. For example, a network element hardware property threshold corresponding to a pre-correction bit error rate of a 10G optical module is usually 10 to a power of −6, a network element hardware property threshold corresponding to a pre-correction bit error rate of a 40G optical module is usually 10 to a power of −5, and a network element hardware property threshold corresponding to a pre-correction bit error rate of a 100G optical module is usually 10 to a power of −5. A network element hardware property threshold corresponding to a laser optical power KPI is usually −60 dB.

One method for determining the threshold distance score by the detection device includes determining, by the detection device, the threshold distance score based on sampled data of the target KPI in the detection moment (that is, the end time of the first time window) and a preset network element hardware property threshold corresponding to the target KPI.

For example, the threshold distance score may be calculated using the following formula:

$$sThresDist = \begin{cases} x \geq x_{THD} & 100 * \frac{|x - x_{THD}|}{\max((x_{max} - x_{THD}), (x_{THD} - x_{min}))}, \\ x < x_{THD} & 0 \end{cases}$$

where x is the sampled data in the detection moment, $x_{THD}$ is the network element hardware property threshold corresponding to the target KPI, $x_{min}$ is a theoretical minimum value of the target KPI, and $x_{max}$ is a theoretical maximum value of the target KPI, where $x_{min}$ and $x_{max}$ may be preset values.

According to the formula, when the sampled data in the detection moment is greater than the network element hardware property threshold, a distance between the sampled data in the detection moment and the network element hardware property threshold is smaller, that is, a threshold distance is smaller, and a threshold distance score of the target KPI is lower. This indicates lower reliability of the target network element reflected by the target KPI. When the sampled data in the detection moment is less than the network element hardware property threshold, the threshold distance score of the target KPI is 0, and this indicates that reliability of the target network element reflected by the target KPI is very low.

Another method for determining the threshold distance score by the detection device includes determining, by the detection device, the threshold distance score based on sampled data of the target KPI in a fourth time window and a preset network element hardware property threshold corresponding to the target KPI. An end time of the fourth time window is the same as the end time of the first time window, and the fourth time window is usually less than the first time window. For example, the fourth time window is 1 hour. An average value is calculated for the sampled data in the fourth time window, and a difference between the average value and the network element hardware property threshold is used as the threshold distance. For example, the threshold distance score may be calculated using the following formula:

$$sThresDist = \begin{cases} x \geq x_{THD} & 100 * \frac{|x - x_{THD}|}{\max((x_{max} - x_{THD}), (x_{THD} - x_{min}))}, \\ x < x_{THD} & 0 \end{cases}$$

where x is the average value, $x_{THD}$ is the network element hardware property threshold corresponding to the target KPI, $x_{min}$ is a theoretical minimum value of the target KPI, and $x_{max}$ is a theoretical maximum value of the target KPI, where $x_{min}$ and $x_{max}$ may be preset values.

A trend is one of important indicators for measuring accuracy of the network element health status. A trend of the target KPI is used to represent a change trend of the target KPI. Correspondingly, the trend score of the target KPI is used to represent a change (an increase or a decrease) of the target KPI and a change speed.

The detection device may calculate the trend score of the target KPI based on sampled data of the target KPI in a third time window. An end time of the third time window is less than or equal to the end time of the first time window. As shown in FIG. 3, the end time of the third time window is equal to the end time of the first time window. As shown in FIG. 4, the end time of the third time window is less than the end time of the first time window. The third time window is usually greater than the first time window, for example, a length of the third time window is three days.

In some implementations, the detection device may sequentially sort the sampled data based on a collection time of the sampled data of the target KPI in the third time window to obtain sorted data, decompose the sorted data to obtain a trend component in the target KPI, and determine the trend score of the target KPI based on the trend component.

For example, the detection device uses an exponential smoothing model (e.g., Health Workforce Simulation Model (HWSM)) to decompose the sorted data into a trend component, a seasonal component, and a random component. The exponential smoothing model may be an additive model shown below:

$$x_i = w_i + s_i + \varepsilon_i,$$

where $x_i$ is sampled data in an i moment, $w_i$ a random component in the i moment, $s_i$ is a seasonal component in the i moment, and $\varepsilon_i$ is a random component in the i moment.

Then, the trend score is determined based on a slope k of the trend component.

If the trend component decreases, it indicates poor reliability, and the trend score is calculated using the following formula:

$$sTrend = \begin{cases} k < 0 & 100 * e^k \\ k \geq 0 & 100 \end{cases}.$$

If the trend component increases, it indicates poor reliability, and the trend score is calculated using the following formula:

$$sTrend = \begin{cases} k > 0 & 100 * e^{-k} \\ k \leq 0 & 100 \end{cases}.$$

The detection device may use the foregoing formulas to obtain the reliability score of the target network element through the weighted calculation according to the fluctuation score of the at least one KPI, a trend score of the at least one KPI, or a score of a distance between the at least one KPI and the network element hardware property threshold.

If the at least one KPI includes a plurality of KPIs, in step 240, the detection device may perform weighted calculation on a reliability score of each of the plurality of KPIs to determine the reliability score of the target network element, and then determine the health status of the target network element based on reliability of the target network element.

Figure 5:
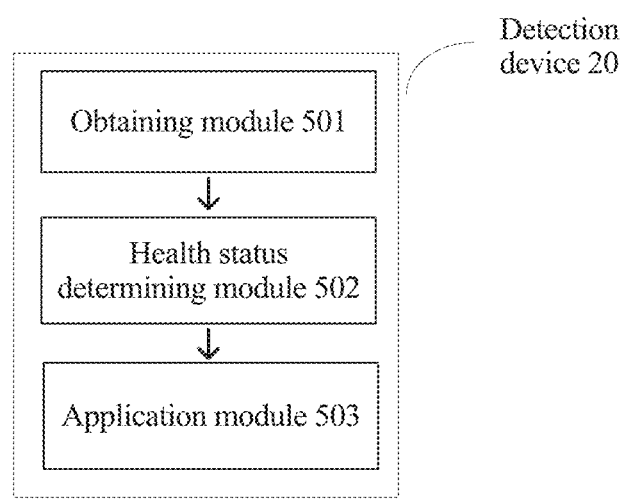
FIG. 5 is a schematic diagram of a network element health status detection apparatus according to an embodiment of the present disclosure.

FIG. 5 is a schematic diagram of a network element health status apparatus according to an embodiment of the present disclosure, where the network element health status apparatus may be configured to implement the detection method provided in the foregoing method embodiments of the present disclosure. As shown in FIG. 5, a detection device 20 includes an obtaining module 501, a health status determining module 502, and may further include an application module 503 and a configuration interface.

The obtaining module 501 is configured to obtain sampled data of at least one KPI of a target network element.

The health status determining module 502 is configured to: obtain a fluctuation score of any KPI in the at least one KPI (referred to as a target KPI below) according to sampled data of the target KPI in a first time window and a steady state value of the target KPI; and determine a health status of the target network element based on a fluctuation score of each of the at least one KPI. The health status determining module 502 may determine a network element health status using an intelligent reliability evaluation model. The sampled data of the at least one key performance indicator KPI of the target network element is input to the intelligent reliability evaluation model, and the intelligent reliability evaluation model outputs the health status of the target network element.

The application module 503 is configured to obtain a reliability distribution diagram of the target network element according to the health status of the target network element, where the reliability distribution diagram may include a fault area, a sub-healthy area, and a normal area. The fault area is used to display information about a network element in a fault state; the sub-healthy area is used to display information about a network element in a sub-healthy state; and the normal area is used to display information about a network element in a normal state.

Based on the obtained reliability score, the health status of the target network element is determined, and the health status of the target network element is specifically divided into three states, such that the health status of the target network element can be obtained more visually. For example, if the target network element is in the sub-healthy state, an active warning may be prompted. Alternatively, if the target network element is in the fault state, a fault may be prompted and a fault alarm is given.

For example, when the detection device is a computer, the application module 503 is an application layer. The application module 503 in the detection device 20 provides a network element health status distribution diagram, and a display screen of the computer provides a visual picture. It can be visually observed in the visual picture that at least one target network element is in one of the fault area, the sub-healthy area, or the normal area.

The configuration interface is configured to configure a parameter based on a service type of the at least one target network element at a network device layer that needs to be analyzed.

For example, if the network element health status is evaluated based on the wavelength division service provided by the target network element, configuration is performed according to the configuration method in S210, and details are not described herein again.

In some implementations, fluctuation is used to represent a degree of deviation of the target KPI from a steady state represented by the steady state value.

The health status determining module 502 is configured to: calculate a distance between the sampled data of the target KPI in the first time window and the steady state value of the target KPI; and obtain a fluctuation score according to the distance between the sampled data of the target KPI in the first time window and the steady state value of the target KPI.

The health status determining module 502 may be configured to calculate the distance between the sampled data of the target KPI in the first time window and the steady state value of the target KPI using one of a standard deviation method, an average deviation method, or a variation coefficient method.

The health status determining module 502 is further configured to calculate the steady state value of the target KPI based on sampled data of the target KPI in a second time window, where the second time window is greater than the first time window, and an end time of the second time window is less than or equal to an end time of the first time window. Because the second time window is greater than the first time window, a large amount of data is collected in the second time window, and a steady state of the target KPI is better represented. Therefore, a fluctuation score that is obtained based on the sampled data in the first time window and by considering the steady state value calculated from the sampled data in the second time window is more accurate.

The health status determining module 502 may be configured to calculate the steady state value of the target KPI based on the sampled data of the target KPI in the second time window after an abnormal point and/or a noise point are/is removed.

The health status determining module 502 may be configured to: obtain a reliability score of the target KPI through weighted calculation according to the fluctuation score and at least one of a trend score of the target KPI or a score of a distance between the target KPI and a network element hardware property threshold; and determine the health status of the target network element based on a reliability score of each of the at least one KPI. If the health status of the target network element is determined based only on a fluctuation score of each of the at least one KPI, the fluctuation score in the process is equivalent to the reliability score. In another method, a reliability score of the target network element is obtained through weighted calculation according to the fluctuation score and the score of the distance between the target KPI and the network element hardware property threshold, and the health status of the target network element may be determined based on the reliability score of the target network element. In this method, not only the fluctuation score is considered, but also the score of the distance between the target KPI and the network element hardware property threshold is considered. Therefore, the method may accurately determine the health status of the target network element. In still another method, a reliability score of the target network element is obtained through weighted calculation according to the fluctuation score of the target KPI and the trend score of the target KPI, and the health status of the target network element may be determined based on the reliability score of the target network element. In this method, not only the fluctuation score is considered, but also the trend score is considered. Therefore, the method may accurately determine the health status of the target network element.

The health status determining module 502 is configured to determine sampled data of the target KPI of the target network element in a detection moment, where the detection moment is the end time of the first time window. The detection device 20 determines a score of a distance between the target KPI and the network element hardware property threshold based on the sampled data of the target KPI in the detection moment and a preset network element hardware property threshold of the target KPI.

The health status determining module 502 is configured to obtain the reliability score of the target KPI through weighted calculation according to the fluctuation score of the target KPI, the trend score of the target KPI, and the score of the distance between the target KPI and network element hardware property threshold. Because the fluctuation score of the target KPI, the trend score of the target KPI, and the score of the distance between the target KPI and the network element hardware property threshold are all considered, network element performance is determined using both single-point performance data of a network element and performance data in a network element time window, a reliability score is obtained according to the network element performance, and the network element health status is determined based on the reliability score. In the process, health of the network element is identified more accurately.

The health status determining module 502 is configured to: sequentially sort sampled data based on a collection time of the sampled data of the target KPI in a third time window to obtain sorted data, decompose the sorted data, and determine a trend component; and determine the trend score of the target KPI based on the trend component. The third time window is greater than the first time window, and an end time of the third time window is less than or equal to the end time of the first time window. The collection time of the sampled data of the target KPI in the third time window is fully used to sequentially sort the sampled data to obtain the sorted data, decompose the sorted data to obtain the trend component of the target KPI, and determine the trend score of the target KPI based on the trend component of the target KPI. Therefore, in the process, a more accurate trend score can be obtained.

The health status determining module 502 is configured to: perform weighted calculation on a reliability score of each of a plurality of KPIs to determine the reliability score of the target network element; and determine the health status of the target network element based on the reliability score of the target network element. The reliability score of the target network element is determined through the weighted calculation. Therefore, accuracy of detecting the health status of the target network element is improved.

Figure 6:
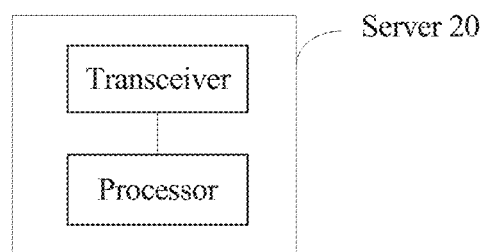
FIG. 6 is a schematic diagram of a network element health status detection device according to an embodiment of the present disclosure.

FIG. 6 is a schematic diagram of a network element health status detection device according to an embodiment of the present disclosure. As shown in FIG. 6, this embodiment of this application provides the network element health status detection device. The device includes a transceiver and a processor. The transceiver is configured to receive sampled data of at least one key performance indicator KPI of a target network element. The processor is configured to obtain a fluctuation score of any KPI in at least one KPI according to sampled data of the any KPI in a first time window and a steady state value of the any KPI. The processor is further configured to determine a health status of the target network element based on a fluctuation score of each of the at least one KPI.

In this solution, using the transceiver and the processor of the device, a network element health status is determined using single-point performance data of a network element and performance data in a network element time window. A problem of inaccurate judgment by considering only single-point moment performance data of the network element is resolved. Therefore, this solution can be used to identify the network element health status more accurately.

The foregoing fluctuation is used to represent a degree of deviation of the any KPI from a steady state represented by the steady state value.

The processor is further configured to: calculate a distance between the sampled data of the any KPI in the first time window and the steady state value of the any KPI; and obtain the fluctuation score according to the distance between the sampled data of the any KPI in the first time window and the steady state value of the any KPI.

The processor is further configured to calculate the distance between the sampled data of the any KPI in the first time window and the steady state value of the any KPI using one of a standard deviation method, an average deviation method, or a variation coefficient method.

The fluctuation score is obtained according to the distance between the sampled data of the any KPI in the first time window and the steady state value of the any KPI, and the health status of the target network element is determined by the fluctuation score. Therefore, the distance between the sampled data of the any KPI in the first time window and the steady state value is calculated using one of the standard deviation method, the average deviation method, or the variation coefficient method, and then the fluctuation score is determined based on the distance between the sampled data and the steady state value. In this way, it can be ensured that a more accurate fluctuation score of the any KPI is obtained, such that the health status of the target network element is determined more accurately.

The processor is further configured to determine sampled data of the any KPI in a second time window, where the second time window is greater than the first time window, and an end time of the second time window is less than or equal to an end time of the first time window.

The processor is further configured to calculate a steady state value of the any KPI based on the sampled data of the any KPI in the second time window. Because the second time window is greater than the first time window, a large amount of data is collected in the second time window, and a state of the any KPI is better represented. Therefore, a fluctuation score that is obtained based on the sampled data in the first time window and by considering the steady state value calculated from the sampled data in the second time window is more accurate.

The processor is further configured to calculate the steady state value of the any KPI based on the sampled data of the any KPI in the second time window after an abnormal point and/or a noise point are/is removed. The sampled data in the second time window is not fully applied to calculate the steady state value of the any KPI. Therefore, in this method, the abnormal point and/or the noise point in the sampled data in the second time window need/needs to be removed, and the steady state value of the any KPI is calculated accurately based on the sampled data of the any KPI after the abnormal point and/or the noise point are/is removed.

The processor is further configured to: obtain a reliability score of the any KPI through weighted calculation according to the fluctuation score and at least one of a trend score of the any KPI or a score of a distance between the any KPI and a network element hardware property threshold; and determine the health status of the target network element based on a reliability score of each of the at least one KPI. If the health status of the target network element is determined based on a fluctuation score of each of the at least one KPI, the fluctuation score in the process is equivalent to the reliability score. In another method, a reliability score of the target network element is obtained through weighted calculation according to the fluctuation score and the score of the distance between the any KPI and the network element hardware property threshold, and the health status of the target network element may be determined based on the reliability score of the target network element. In this method, not only the fluctuation score is considered, but also the score of the distance between the any KPI and the network element hardware property threshold is considered. Therefore, in this method, the health status of the target network element is determined accurately. In still another method, a reliability score of the target network element is obtained through weighted calculation according to the fluctuation score of the any KPI and the trend score of the any KPI, and the health status of the target network element may be determined based on the reliability score of the target network element. In this method, not only the fluctuation score is considered, but also the trend score is considered. Therefore, in this method, the health status of the target network element is determined accurately.

The processor is further configured to determine sampled data of the any KPI of the target network element in a detection moment, where the detection moment is the end time of the first time window. The detection device determines a score of a distance between the any KPI and the network element hardware property threshold based on the sampled data of the any KPI in the detection moment and a preset network element hardware property threshold of the any KPI.

The processor is further configured to obtain a reliability score of the any KPI through weighted calculation according to the fluctuation score of the any KPI, the trend score of the any KPI, and the score of the distance between the any KPI and the network element hardware property threshold. Because the fluctuation score of the any KPI, the trend score of the any KPI, and the score of the distance between the any KPI and the network element hardware property threshold are all considered, network element performance is determined using both the single-point performance data of the network element and the performance data in the network element time window, a reliability score is obtained according to the network element performance, and the network element health status is determined based on the reliability score. In the process, health of the network element is identified more accurately.

The processor is further configured to determine sampled data of the any KPI of the target network element in a third time window, where the third time window is greater than the first time window, and an end time of the third time window is less than or equal to the end time of the first time window.

The processor is further configured to: sequentially sort the sampled data based on a collection time of the sampled data of the any KPI in the third time window to obtain sorted data, decompose the sorted data, and determine a trend component of the any KPI; and determine the trend score of the any KPI based on the trend component of the any KPI. The collection time of the sampled data of the any KPI in the third time window is fully used to sequentially sort the sampled data to obtain the sorted data, decompose the sorted data to obtain the trend component of the any KPI, and determine the trend score of the any KPI based on the trend component of the any KPI. Therefore, in the process, a more accurate trend score can be obtained.

The processor is further configured to: perform weighted calculation on a reliability score of each of a plurality of KPIs to determine the reliability score of the target network element; and determine the health status of the target network element based on the reliability score of the target network element. The reliability score of the target network element is determined through the weighted calculation. Therefore, accuracy of detecting the health status of the target network element is improved.

The "health status of the target network element" may include: a fault state, a sub-healthy state, or a normal state. Based on the obtained reliability score, the health status of the target network element is determined, and the health status of the target network element is specifically divided into three states, such that the health status of the target network element can be obtained more visually. For example, if the target network element is in the sub-healthy state, an active warning may be prompted. Alternatively, if the target network element is in the fault state, a fault may be prompted and a fault alarm is given.

The "at least one KPI" may include a pre-correction bit error rate and/or a post-correction bit error rate.

The foregoing descriptions about implementations allow a person skilled in the art to clearly understand that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, function units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present disclosure essentially, or the part contributing to other approaches, or all or some of the technical solutions may be implemented in the form of a software product. The computer software product is stored in a storage medium and includes several instructions for instructing a computer device (which may be a personal computer, a detection device, or a network device) or a processor to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A network element health status detection method, comprising:
   determining first sampled data of at least one key performance indicator (KPI) of a target network element in a first time window;
   determining third sampled data of the at least one KPI in a third time window, wherein the third time window is greater than the first time window, and wherein a third end time of the third time window is less than or equal to a first end time of the first time window;
   obtaining a fluctuation score of the at least one KPI according to the first sampled data of the at least one KPI in the first time window and a steady state value of the at least one KPI;
   obtaining a trend score of the at least one KPI according to the third sampled data of the at least one KPI in the third time window; and
   determining, a health status of the target network element based on the fluctuation score and the trend score of the at least one KPI.

2. The method according to claim 1, wherein the fluctuation score represents a degree of deviation of the at least one KPI from a steady state represented by the steady state value.

3. The method according to claim 1, wherein obtaining the fluctuation score comprises:
   calculating a distance between the first sampled data of the at least one KPI in the first time window and the steady state value of the at least one KPI; and
   obtaining the fluctuation score according to the distance between the first sampled data of the at least one KPI in the first time window and the steady state value of the at least one KPI.

4. The method according to claim 3, wherein calculating the distance comprises calculating the distance between the first sampled data of the at least one KPI in the first time window and the steady state value of the at least one KPI using one of a standard deviation method, an average deviation method, or a variation coefficient method.

5. The method according to claim 1, further comprising:
   determining second sampled data of the at least one KPI in a second time window, wherein the second time window is greater than the first time window, and wherein a second end time of the second time window is less than or equal to the first end time of the first time window; and calculating the steady state value of the at least one KPI based on the second sampled data of the at least one KPI in the second time window.

6. The method according to claim 5, wherein calculating the steady state value comprises calculating the steady state value of the at least one KPI based on the second sampled data of the at least one KPI in the second time window after at least one of an abnormal point or a noise point is removed.

7. The method according to claim 1, wherein determining the health status of the target network element comprises:

obtaining a reliability score of the at least one KPI through weighted calculation according to the fluctuation score and the trend score of the at least one KPI; and determining the health status of the target network element based on the reliability score of the at least one KPI.

8. The method according to claim 7, further comprising:

determining fourth sampled data of the at least one KPI of the target network element in a detection moment, wherein the detection moment is the first end time of the first time window;

determining a score of a distance between the at least one KPI and a network element hardware property threshold based on the fourth sampled data and a preset network element hardware property threshold of the at least one KPI; and determining the health status of the target network element based on the fluctuation score, the trend score of the at least one KPI, and the score of the distance between the at least one KPI and the network element hardware property threshold.

9. The method according to claim 8, further comprising:

decomposing the third sampled data of the at least one KPI in the third time window to determine a trend component of the at least one KPI; and obtaining the trend score of the at least one KPI according to the trend component of the at least one KPI.

10. The method according to claim 7, wherein the at least one KPI comprises a plurality of KPIs, and wherein determining the health status of the target network element comprises:

performing weighted calculation on reliability scores of each of the plurality of KPIs to determine a second reliability score of the target network element; and determining the health status of the target network element based on the second reliability score of the target network element.

11. The method according to claim 1, wherein the health status of the target network element comprises a fault state, a sub-healthy state, or a normal state.

12. The method according to claim 1, wherein the at least one KPI comprises a pre-correction bit error rate or a post-correction bit error rate.

13. A network element health status detection apparatus, comprising:

a processor; and a non-transitory computer readable medium containing computer-executable instructions executable by the processor such that when executed, enable the network element health status detection apparatus to:

determine first sampled data of at least one key performance indicator (KPI) of a target network element in a first time window;

determine third sampled data of the at least one KPI in a third time window, wherein the third time window is greater than the first time window, and wherein a third end time of the third time window is less than or equal to a first end time of the first time window;

obtain a fluctuation score of the at least one KPI according to the first sampled data of the at least one KPI in the first time window and a steady state value of the at least one KPI;

obtain a trend score of the at least one KPI according to the third sampled data of the at least one KPI in the third time window; and determine a health status of the target network element based on the fluctuation score and the trend score of the at least one KPI.

14. The apparatus according to claim 13, wherein the fluctuation score represents a degree of deviation of the at least one KPI from a steady state represented by the steady state value.

15. The apparatus according to claim 13, wherein the apparatus obtains the fluctuation score by:

calculating a distance between the first sampled data of the at least one KPI in the first time window and the steady state value of the at least one KPI; and obtaining the fluctuation score according to the distance between the first sampled data of the at least one KPI in the first time window and the steady state value of the at least one KPI.

16. The apparatus according to claim 15, wherein calculating the distance comprises the apparatus calculating the distance between the first sampled data of the at least one KPI in the first time window and the steady state value of the at least one KPI using one of a standard deviation method, an average deviation method, or a variation coefficient method.

17. The apparatus according to claim 13, wherein the processor is further configured to execute the computer-executable instructions to enable the apparatus to:

determine second sampled data of the at least one KPI in a second time window, wherein the second time window is greater than the first time window, and wherein a second end time of the second time window is less than or equal to the first end time of the first time window; and calculate the steady state value of the at least one KPI based on the second sampled data of the at least one KPI in the second time window.

18. The apparatus according to claim 17, wherein the apparatus calculates the steady state value by calculating the steady state value of the at least one KPI based on the second sampled data of the at least one KPI in the second time window after at least one of an abnormal point or a noise point is removed.

19. The apparatus according to claim 13, wherein the apparatus determines the health status of the target network element by:

obtaining a reliability score of the at least one KPI through weighted calculation according to the fluctuation score and the trend score of the at least one KPI; and determining the health status of the target network element based on the reliability score of the at least one KPI.

20. The apparatus according to claim 19, wherein the processor is further configured to execute the computer-executable instructions to enable the apparatus to:

determine fourth sampled data of the at least one KPI of the target network element in a detection moment, wherein the detection moment is the first end time of the first time window;

determine a score of a distance between the at least one KPI and a network element hardware property threshold based on the fourth sampled data of the at least one KPI in the detection moment and a preset network element hardware property threshold of the at least one KPI; and determine the health status of the target network element based on the fluctuation score, the trend score of the at least one KPI, and the score of the distance between the at least one KPI and the network element hardware property threshold.

21. The apparatus according to claim 20, wherein the processor is further configured to execute the computer-executable instructions to enable the apparatus to:

decompose the third sampled data of the at least one KPI in the third time window to determine a trend component of the at least one KPI; and obtain the trend score of the at least one KPI according to the trend component of the at least one KPI.

22. The apparatus according to claim 19, wherein the at least one KPI comprises a plurality of KPIs, and wherein the apparatus determines the health status of the target network element by:

performing weighted calculation on reliability scores of each of the plurality of KPIs to determine a second reliability score of the target network element; and determining the health status of the target network element based on the second reliability score of the target network element.

23. The apparatus according to claim 13, wherein the health status of the target network element comprises one of a fault state, a sub-healthy state, or a normal state.

* * * * *